United States Patent [19]

Peters

[11] 4,055,291
[45] Oct. 25, 1977

[54] EXPLOSION BONDING OF BIPOLAR ELECTRODE BACKPLATES

[75] Inventor: Edward J. Peters, Chardon, Ohio

[73] Assignee: Diamond Shamrock Corporation, Cleveland, Ohio

[21] Appl. No.: 761,268

[22] Filed: Jan. 21, 1977

Related U.S. Application Data

[63] Continuation of Ser. No. 640,643, Dec. 15, 1975, abandoned.

[51] Int. Cl.² .............................................. B23K 21/00
[52] U.S. Cl. ...................................... 228/108; 204/256
[58] Field of Search ................... 204/254, 256, 290 R, 204/290 F, 268; 228/107–109; 429/210

[56] References Cited

U.S. PATENT DOCUMENTS

| | | | |
|---|---|---|---|
| 3,137,937 | 6/1964 | Cowan et al. | 228/108 |
| 3,233,312 | 2/1966 | Cowan et al. | 228/109 X |
| 3,380,908 | 4/1968 | Ono et al. | 228/107 X |
| 3,562,887 | 2/1971 | Schroeder et al. | 228/107 X |
| 3,726,460 | 4/1973 | Lemonds et al. | 228/107 X |
| 3,900,147 | 8/1975 | Apalikov et al. | 228/107 |

Primary Examiner—C. F. LeFevour
Attorney, Agent, or Firm—Bruce M. Winchell

[57] ABSTRACT

Disclosed is a method for electrically and mechanically connecting the backplates of a bipolar electrode to be used in a filter press electrolytic cell for electrochemical production. This method employs the use of explosion bonded solid metallic strips between the two backplates of a bipolar electrode to provide the essential electrical and mechanical connection therebetween while leaving sufficient air space to allow the escape of hydrogen gas thereby preventing hydrogen embrittlement of the titanium anode backplate.

4 Claims, 3 Drawing Figures

EXPLOSION BONDING OF BIPOLAR ELECTRODE BACKPLATES

This is a continuation, of application Ser. No. 640,643, filed Dec. 15, 1975 now abandoned.

BACKGROUND OF THE INVENTION

The present invention relates generally to an electrolytic cell of the filter press type wherein a series of bipolar electrodes with diaphragms or membranes sandwiched in between can be used for electrochemical production of alkali metal hydroxides and halogens. More particularly, the present disclosure relates to an improved method for connecting the backplates of the bipolar electrodes by an explosion bonding process which provides the essential electrical and mechanical connection therebetween while leaving sufficient air space to allow hydrogen gas to escape from within the cell thereby preventing hydrogen embrittlement of the titanium anode backplate.

Chlorine and caustic (sodium hydroxide) are essential and large volume commodities which are basic chemicals required in all industrial societies. They are produced almost entirely electrolytically from aqueous solutions of alkali metal chlorides, with a major proportion of current production coming from the diaphragm type electrolytic cells. These cells generally have a plurality of electrodes disposed within the cell structure to present a plurality of rows of alternatively spaced anodes and cathodes. These electrodes are generally foraminous in nature and made of a screen or mesh material so that a hydraulically permeable diaphragm may be formed over the cathode. This compartmental cell will allow fluid flow through the cell structure. Brine (sodium chloride) starting material is continuously fed into the cell through the anode compartment and flows through the diaphragm backed by the cathode. To minimize back-diffusion and migration through the hydraulically permeable diaphragm, the flow rate is always maintained in excess of the conversion rate so that resulting catholyte solution has unreacted alkali metal chloride present. This catholyte solution, containing sodium hydroxide, unreacted sodium chloride, and certain other impurities, must then be concentrated and purified to obtain a marketable sodium hydroxide commodity and a sodium chloride solution to be reused in the diaphragm electrolytic cell. This is a serious drawback since the costs of this concentration and purification process are rising rapidly.

With the advent of technological advances such as the dimensionally stable anode which permits ever narrowing gaps between the electrodes, and the hydraulically impermeable membrane, other electrolytic cell structures are being considered. The geometry of the diaphragm cell structure makes it inconvenient to place a planar membrane between the electrodes, hence the filter press electrolytic cell structure with planar electrodes has been proposed as an alternate electrolytic cell structure.

A filter press electrolytic cell is a cell consisting of several units in series, as in a filter press, in which each electrode, except the two end electrodes, acts as an anode on one side and a cathode on the other, and the space between these bipolar electrodes is divided into an anode and cathode compartments by a membrane. In a typical operation, alkali metal halide is fed into the anode compartment where halogen gas is generated at the anode. Alkali metal ions are selectively transported through the membrane into the cathode compartment, and combine with hydroxyl ions generated at the cathode by the electrolysis of water to form the alkali metal hydroxides. In this cell the resultant alkali metal hydroxide is sufficiently pure to be commercially marketable, thus eliminating an expensive salt recovery step of processing. Cells where the bipolar electrodes and the diaphragms or membranes are sandwiched into a filter press type construction may be electrically connected in series, with the anode of one connected with the cathode of an adjoining cell through a common structural member or partition. This arrangement is generally known as a bipolar configuration. A bipolar electrode is an electrode without direct metallic connection with the current supply, one face of which acts as an anode and the opposite face as a cathode when an electric current is passed through the cell.

While the bipolar configuration provides a certain economy for electrical connection of these electrodes in series there is a serious problem with the corrosion of cell components in contact with anolyte. The anolyte normally contains highly corrosive concentrations of free halide, and the use of base metals such as iron to contain the solution have proven to be ineffective.

Proposals to overcome this problem include utilizing valve metals or alloys thereof to contain anolyte, either by fabricating an entire electrode from such a corrosion resistant material or by bonding a coating of valve metal onto a base metal within the anolyte compartment. The use of large quanitities of expensive valve metals in commercial cell construction, though, has proven to be economically undesirable. The coated base metals on the other hand are prone to disintegration by pealing off of the protective layer and have also proven ineffective. It has been found that use of an air space between the backplates will act as an insulator against hydrogen embrittlement since the hydrogen ions combine to form harmless molecular hydrogen, which can be vented off, more readily than they move through the air space. This then provides a convenient means for solving the embrittlement problem but leaves the problem of properly connecting the backplates. Resistance welding would be ideal except that there are only insufficient methods available for welding different metallic materials together such as steel, copper and titanium.

Electrical and mechanical connection of these bipolar electrodes has been accomplished by internal bolting systems wherein the electrode is bolted through one pan, providing a spaced relation by use of a spacer of some sort, and through the second pan to the other electrode. Another method employs the use of an external busbar, outside of the electrolytic cell structure. Electrical connections made by the internal bolting systems are undesirable because elaborate sealing schemes are necessary to prevent electrolyte leakage which could result in an extreme corrosion of the cathode compartment. This increases the cell costs and necessitates frequent maintenance. Electrical connections made externally are also not desirable since larger power losses are occasioned by the added structural voltage drops.

Thus, it has become exceedingly advantageous to provide a method for connecting the bipolar electrode backplates in a spaced relation at a commercially viable cost.

SUMMARY OF THE INVENTION

It is therefore an object of the present invention to provide a bipolar electrode which is capable of insertion into a filter press electrolytic cell that will have a greatly simplified means of connectng the two plates to provide a bipolar electrode capable of withstanding commercial electrochemical production, at a significantly reduced manufacturing cost.

It is another object of the present invention to provide an improved method for electrically and mechanically connecting the anode and cathode backplates of a bipolar electrode wherein a good current efficiency is achieved such that commercial electrochemical production would be facilitated thereby.

These and other objects of the present invention, together with the advantages thereof over existing and prior art forms which will become apparent to those skilled in the art from the detailed disclosure of the present invention as set forth hereinbelow, are accomplished by the improvements herein shown, described, and claimed.

It has been found that the anode and cathode backplates of a bipolar electrode for use in a filter press electrolytic cell can be connected mechanically and electrically by placing a spaced series of strips of a solid metallic electrical conductor in a spaced relation of at least 0.001 inch (0.0254 mm) from one of the backplates parallel thereto; placing a layer of a detonating explosive having a detonation velocity of less than 120 percent of the sonic velocity of the metal having the highest sonic velocity in the system, on the outside surface of one of the metallic layers; initiating said explosive so that detonation is propogated parallel to said strips of solid metallic electrical conductor such that the pressure upon collision of the series of strips with the backplate is greater than the elastic limit of the metal having the lowest elastic limit in the system; and connecting the other backplate to the series of strips of solid metallic electrical conductor.

DESCRIPTION OF THE PREFERRED EMBODIMENTS

Figure 1:
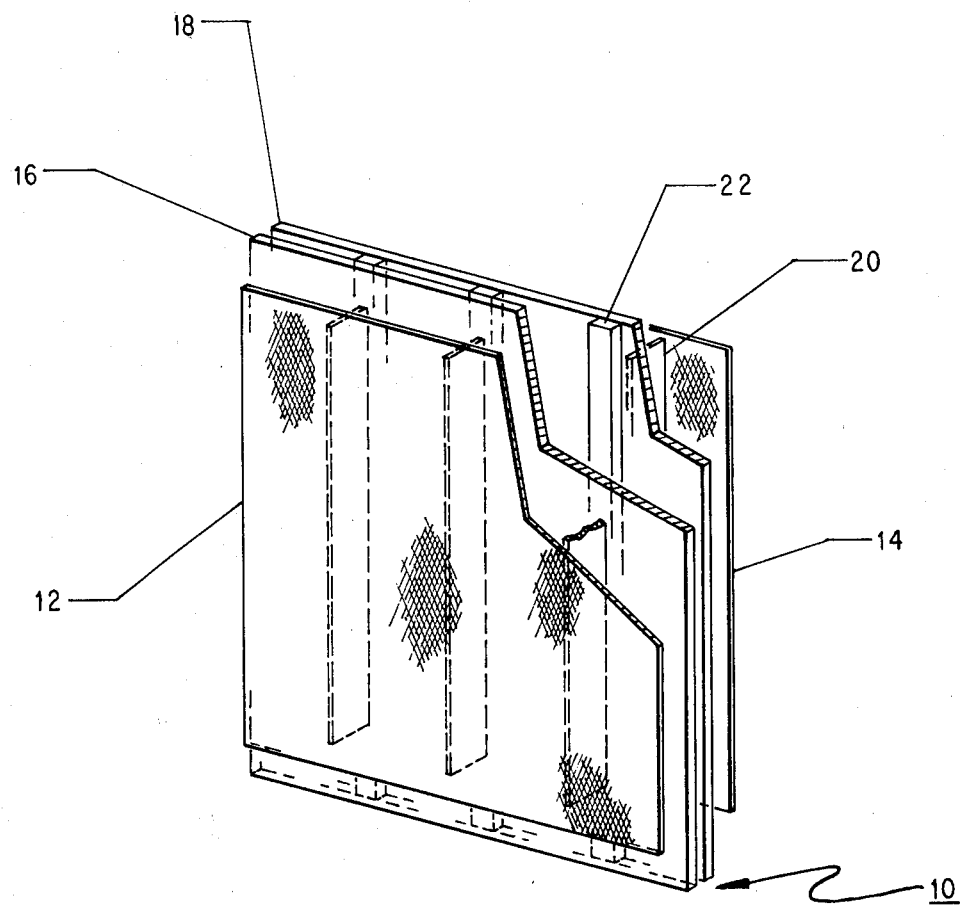
FIG. 1 is a perspective view of the anode and cathode backplates of a bipolar electrode with the mechanical and electrical connection effected therebetween by explosion bonded solid metallic strips therebetween according to the concepts of the present invention.

Referring to the drawings, numeral 10 generally refers to a bipolar electrode assembled by a method according to the concepts of the present invention. The bipolar electrode 10 has an anode 12 which is generally foraminous in nature and can be made of a screen or mesh material of an appropriate metallic substance. Such foraminous anodes 12 may be made of any conventional electrically conductive electrolytically active material resistance to electrolyte and preferably, a valve metal such as titanium or tantalum or alloys thereof bearing on the surface a noble metal, and noble oxide (either along or in combination with the valve metal oxide), or other electrocatalytically active corrosive resistant material. Anodes of this preferred class are called dimensionally stable anodes and are well know and widely used in the industry. Foraminous anodes such as anode 12 shown in FIG. 1 are generally preferred because of their greater electrolytically active surface areas which facilitate the electrochemical reaction and flow within the compartments of an electrolytic cell. Each bipolar electrode 10 also has a cathode 14 on the reverse side thereof. The cathode 14 similarily may be made of any conventional electrically conductive material resistant to the catholyte, examples including iron, mild steel, stainless steel, and nickel. The cathodes are preferably foraminous, similar to the anodes. The bipolar electrode 10 has an anode backplate 16 and a cathode backplate 18 each of which acts as a supporting base for the anode 12 and the cathode 14 respectively. Generally the anode backplate 16 will be made of the same material as the anode 12 such that conventional resistance weldments may be accomplished between the anode 12 and the anode backplate 16. Similarly, the cathode backplate 18 and cathode 14 are generally made of the same material for ease of connection therebetween. The bipolar electrode 10 as shown in FIG. 1 when fitted into a filter press electrolytic cell will have either a frame surrounding the peripheral edge of the bipolar electrode or the backplates 16 and 18 may be pan shaped so as to present clamping flanges so that a liquid tight engagement between a series of these bipolar electrodes 10 can be accomplished. For ease of illustration, these supporting structures or frames have not been shown. The anode 12 and cathode 14 are connected respectively to the anode backplate 16 and cathode backplate 18 by riser posts or current distributors 20 which are also made of a material corresponding to the materials of the anode 12 and anode backplate 16 and the cathode 14 and cathode backplate 18 respectively. This facilitates use of conventional welding techniques for attaching the anode 12 and cathode 14 to their respective backplates.

It is desirable to use a valve metal for the anode 12 and the anode backplate 16 since this compartment contains an anolyte which normally has highly corrosive concentrations of free halide which can cause corrosion of the anode 12 and anode backplate 16. The anode backplate 16 will generally have a thickness of 0.040 to 0.080 inch (1.016 to 2.032 mm) when titanium is used. The cathode 14 and cathode backplate 18 need not be of such an expensive valve metal since the catholyte is not nearly so corrosive and generally steel will be used for the cathode 14 and cathode backplate 18. The cathode backplate 18 will generally have a thickness of 0.080 to 0.50 inch (2.032 to 12.7 mm) with a preferred thickness of 0.25 inch (6.35 mm) when steel is used. Since it is believed that hydrogen ions generated at the cathode can migrate to the anode backplate and anode of prior art constructions causing hydrogen embrittlement it is necessary to leave some kind of barrier to these ions between the anode backplate 16 and cathode backplate 18. Any insulative material can be used which will resist the flow of atomic hydrogen therethrough and it has been found that air provides such an insulative property very inexpensively since the atomic hydrogen generally combines to form molecular hydrogen which is vented off before the atomic hydrogen reaches the anode backplate 16. Copper also provides a good barrier to atomic hydrogen flow but would be rather expensive if solid copper sheet was used between the backplates. Copper does provide excellent electrical properties though, so to provide this kind of insulative barrier at a lower cost, a spaced series of metallic electrical conductor 22 such as copper strips is placed between the anode backplate 16 and cathode backplate 18 so as to conduct an electrical current and yet provide an insulative zone between the anode backplate 16 and cathode backplate 18 to prevent hydrogen embrittlement of the anode backplate 16. This metallic electrical conductor 22 can be of any substance capable of carrying the necessary amount of electrical current while providing an insulator against hydrogen ion movement with copper being the preferable form because of the cost and electrical conductivity thereof.

The method of the present invention employs an explosion bonding technique to bond the metallic electrical conductor 22 to the anode backplate 16 and cathode backplate 18 in either a one step or two step process. This process can be generally achieved by supporting a layer of one material parallel to the surface of the other material, the inside surfaces being spaced apart slightly and placing on the outer surface of one layer a detonating explosive having a velocity of detonation less than 120 percent of the velocity of sound in that metal in the system having the highest sonic velocity and thereafter initiating the explosive layer. Usually it is desirable to use an explosive having a detonation velocity not greater than the velocity of sound in that metal with the higher sonic velocity. The metal layers must be separated from each other a distance at least sufficient for the explosive propelled layer to achieve an adequate velocity before impact with the stationary layer, a spacing of 0.001 inch (0.0254 mm) between the facing surfaces of the two layers represents the minumum spacing to produce consistently adequate results. The maximum separation will almost depend almost entirely upon the reduction of the velocity of the propelled layer caused by the air layer between the two metals. By increasing the explosive loading or evacuating the space between the layers, spacings much greater than 0.001 inch (0.0254 mm) are feasible. In general, however, separation of more than 0.5 inch (12.7 mm) is not convenient or necessary.

A 0.0625 inch (1.5875 mm) layer of copper can be clad onto a 0.5 inch (12.7 mm) a plate of mild steel in the following manner. The copper sheet was covered on one side with a one inch (25.4 mm) thick layer of polystyrene foam and the polystyrene layer was covered with a layer of an explosive composition having a weight distribution of 10 grams per square inch (0.155 grams per square mm.). The explosive employed in this example was a thin uniform sheet of flexible explovive composition comprising 20 percent very fine pentaerythtritol tetranitrate (PETN), 70 percent red lead, and as a binder, 10 percent of a fifty-fifty mixture of butyl rubber and a thermoplastic terpene resin mixture of polymers of $\beta$-pinene of the formula $(C_{10}H_6)_n$, commercially available as PICCOLYTE S-10 (manufactured by the Pennsylvania Industrial Chemical Corp.). Complete details of this composition and a suitable method for its manufacture are disclosed in the U.S. Pat. No. 3,093,521. The composition is readily rolled into sheets and detonates at a velocity of about 4100 meters per second. The edges of the copperpolystyrene-explosive "sandwich" were sealed with waterproof tape, and sandwich was placed on the mild steel with a spacing between the copper layer and the steel layer of 0.0138 inch (0.35 mm) provided by uniform particles of iron powder. These are particles which have been screened to pass through a number 45 mesh and held on a 100 mesh. The edges of the completed assembly were sealed with tape and an electrical initiator was attached to one corner on the explosive layer. The assembly was then immersed in water and the explosion initiated. Excellent bonding of the copper onto the steel resulted.

The next portion of the procedure employed a duplication of the prior process to prepare a titanium on copper cladding. The titanium layer was 0.05 inch (1.27 mm) thick and the copper layer was the same as the preceding. The spacing, which in this case was provided by particles of titanium powder, was 0.0138 inch (0.35 mm) and the weight of the explosive was 10 grams per square inch (0.155 grams per square mm). Following the detonation of the explosive, the titanium and copper sheets were firmly and uniformly bonded. This then formed a sandwich of the cathode backplate 18 made of mild steel to the copper metallic electrical conductor 22 to the anode backplate 16 made of titanium.

A one step process can be accomplished by sandwiching all three components with the same amount of spacing as in the prior procedure, using iron particles and titanium particles as above hereindescribed, placing the explosive to a weight distribution of approximately 15 grams per square inch (0.233 grams per square mm) on top of the titanium anode backplate 16, and the entire structure being sealed inside a box such that the structure may be submerged in water and the initiator detonated. A solid bonding between all three components results from such a process.

Explosing bonding is further described in detail in the following patent which is hereby incorporated by reference: U.S. Pat. No. 3,137,937.

By this technique only about 10 percent of the total area of the anode backplate 16 or the cathode backplate 18 needs to be bonded to a metallic conductor 22 to provide excellent current conducting properties. Also, the air space between the copper strips provides a means for the hydrogen to vent before it attacks the titanium.

Figure 2:
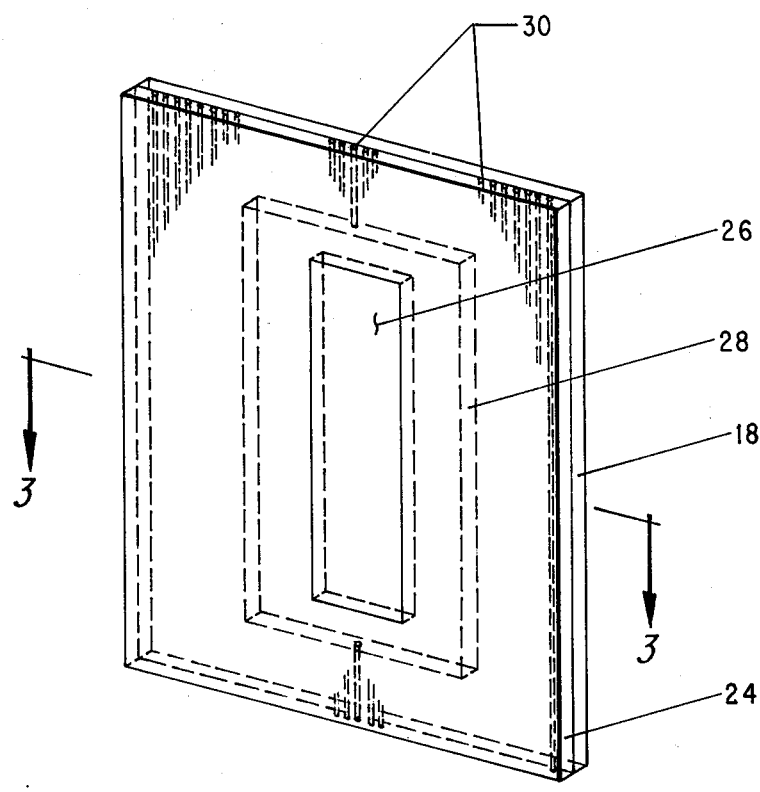
FIG. 2 is a perspective view of an alternate embodiment of a bipolar electrode according to the concepts of the present invention.
Figure 3:
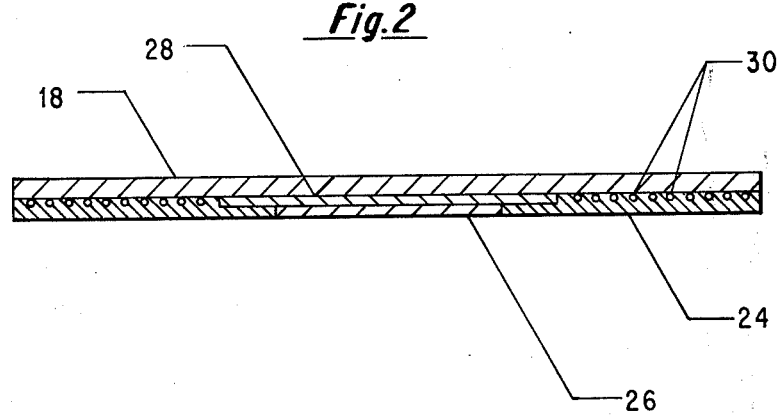
FIG. 3 is a side section view of the second embodiment of the bipolar electrode taken substantially along line 3—3 of FIG. 2.

An alternate embodiment of this concept as pictured in FIG. 2 embodies the use of a cathode backplate 18 lined with a rubber liner 24 on the surface thereof with an anode connector plate 26 in the central portion of the rubber liner 24 backed up by a copper transition 28 between the cathode backplate 18 and the anode connector plate 26. The anode connector plate 26 is explosion bonded with the copper transition 28 to the cathode backplate 18 in the manner heretofore described to provide a connector surface for the anode 12 to be connected to. In this way, as seen in FIG. 2, as even smaller area of anode connector plate made of titanium 26 may be used in a given bipolar electrode 10, thus saving considerable expense. Corrosion protection is provided by the rubber liner 24 or some other suitable material not of a metallic nature bonded to the cathode backplate 18 as seen in FIGS. 2 and 3. The rubber liner 24 is formed over the cathode backplate 18 so as to provide gas ducts 30 between the cathode backplate 18 and the rubber liner 24. These gas ducts 30 permit gaseous substances such as hydrogen to be vented away from the cathode backplate 18. In this embodiment the copper transition 28 protects the titanium from hydrogen embrittlement.

Thus, it should be apparent from the foregoing description of the preferred embodiments that the method herein shown and described accomplishes the objects of the invention and solves the problems attendant to the art heretobefore.

What is claimed is:

1. A method for mechanically and electrically connecting the anode and cathode backplates of a bipolar electrode comprising the steps of: placing a spaced series of strips of solid copper electrical conductor in a spaced relation of at least 0.001 inch (0.0254 mm) from an anode backplate made of a valve metal and parallel thereto; placing a layer of detonating explosive having a detonation velocity of less than 120 percent of the sonic velocity of the metal having the highest sonic velocity in the system, on the outside surface of one of the metal layers; initiating the explosive so that detonation is propagated parallel to the spaced series of strips of solid copper electrical conductor such that the pressure on collision of the spaced series of strips of solid copper electrical conductor with the anode backplate is greater than the elastic limit of the metal having the lowest elastic limit in the system; and connecting the cathode backplate having a metallic makeup selected from the group of iron, mild steel, stainless steel or nickel to the spaced series of strips of solid copper electrical conductor such that about 10 percent of the total area of the anode backplate or the cathode backplate is bonded to the strips of solid copper electrical conductor to provide the current conducting properties while the remaining area is an air space between the strips of solid copper electrical conductor to provide a means for the hydrogen to vent before it attacks the anode backplate.

2. A method according to claim 1 wherein the anode backplate is of titanium, the cathode backplate is of steel, and the series of strips of solid metallic electrical conductor are of copper.

3. A method according to claim 1 wherein the spacing between the backplate and the series of strips of a solid metallic electrical conductor is provided by a uniform particle of powder corresponding to the metallic substance of the backplate being bonded.

4. A method for mechanically and electrically connecting the anode and cathode backplates of a bipolar electrode comprising the steps of: placing a spaced series of strips of solid copper electrical conductor in a spaced relation of at least 0.001 inch (0.0254 mm) from an anode backplate made of a valve metal and parallel thereto; placing the cathode backplate having a metallic makeup selected from the group of iron, mild steel, stainless steel or nickel, on top of the spaced series of solid copper electrical conductor in a spaced relation of at least 0.001 inch (0.0254 mm) from the solid copper electrical conductor and parallel thereto such that a sandwich of the spaced series of solid copper electrical conductor between the two backplates is formed having about 10 percent of the total area of the anode backplate or the cathode backplate in contact with the spaced series of strips of solid copper electrical conductor to provide the current conducting properties while the remaining area is an air space between the spaced series of strips of solid copper electrical conductor to provide a means for the hydrogen to vent before it attacks the anode backplate; placing a layer of detonating explosive having a detonation velocity of less than 120 percent of the sonic velocity of the metal having the highest sonic velocity in the system, on the outside surface of one of the backplates; sealing the entire sandwich structure in a box such that the sandwich structure may be submerged in water; and initiating the explosive to that detonation is propagated parallel to the spaced series of solid copper electrical conductor such that the pressure on collision of the three components of the sandwich exceeds the elastic limit of two of the metallic substances having the lowest elastic limit in the system to form a permanent bond.

* * * * *